United States Patent
Stanton

(12) 
(10) Patent No.: US 6,466,259 B1
(45) Date of Patent: Oct. 15, 2002

(54) COLLECTION OF VIDEO IMAGES CORRELATED WITH SPACIAL AND ATTITUDE INFORMATION

(75) Inventor: Michael Stanton, Anoka, MN (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/224,965

(22) Filed: Jan. 4, 1999

(51) Int. Cl.[7] ................................................. H04N 7/18
(52) U.S. Cl. ........................ 348/148; 348/156; 348/157
(58) Field of Search .................................. 348/148, 157, 348/55; 382/103; 473/156; 370/452; 714/717; 353/94; 701/35

(56) References Cited

U.S. PATENT DOCUMENTS

| | | | | |
|---|---|---|---|---|
| 4,567,513 A | * | 1/1986 | Imsand ......................... | 348/55 |
| 5,413,345 A | * | 5/1995 | Nauck ......................... | 473/156 |
| 5,463,634 A | * | 10/1995 | Smith et al. ................. | 714/717 |
| 5,528,594 A | * | 6/1996 | Butter et al. ................. | 370/452 |
| 5,539,483 A | * | 7/1996 | Nalwa .......................... | 353/94 |
| 5,633,946 A | | 5/1997 | Lachinski et al. ........... | 382/103 |
| 5,671,010 A | * | 9/1997 | Shimbo et al. ............. | 348/157 |
| 6,320,612 B1 | * | 11/2001 | Young ......................... | 348/148 |
| 2001/0005804 A1 | * | 6/2001 | Rayner ......................... | 701/35 |

* cited by examiner

Primary Examiner—Howard Britton
Assistant Examiner—Allen Wong
(74) Attorney, Agent, or Firm—Charles A. Johnson; Mark T. Starr; Nawrocki, Rooney & Sivertson, P.A.

(57) ABSTRACT

Visual and spatial information as a function of time is collected and saved for further processing to determine spacial and target identification for an information database. The later processed information is used to determine the spatial position of an object seen in the visual information. The method includes the high speed collection and time correlation of video images, spatial position information and vehicle attitude with minimal time offset between individual frames of view in digital sets of video data.

4 Claims, 4 Drawing Sheets

COLLECTION OF VIDEO IMAGES CORRELATED WITH SPACIAL AND ATTITUDE INFORMATION

BACKGROUND OF THE INVENTION

1. Field of the Invention

The present invention relates to the collection of video data in a moving vehicle from a plurality of video cameras with time correlated attitude and spacial information.

2. Description of the Prior Art

Previous apparatus has been devised to collect video data from a moving vehicle. In Lachinski et al., U.S. Pat. No. 5,633 946, incorporated herein by reference, analog video data is collected from a number of analog video cameras. Each camera is interrogated by a central processor in a preprogrammed sequence after which the camera resets to capture a video frame for transmission to a central processor for storage. The image response time from each camera is stored with the video image for later processing. Though a significant advance in the art, this approach can result in relatively large timing errors because the exact time of scan initiation is somewhat different for each camera because of the spatial distances and there is no attempt to account for different transmission times. This results in a different time offset of video images with respect to the response time making target identification difficult.

This problem may be further exacerbated if there is a need to move the cameras in relation to one another. This situation can result not only timing errors but varying timing errors.

An additional problem with the Lachinski et al. technique is that the video data is gathered and stored as video images on a video recorder. The actual processing of the images involves playback of the video recording. Therefore, the data must be gathered in real time and yet the final processing cannot be in real time.

SUMMARY OF THE INVENTION

The present invention overcomes the disadvantages of the prior art by providing a system in which the video images of a plurality of video cameras can be time tagged using a system wide time standard and digitized on a frame by frame basis at each station. As a result, the time stamped and digitized images can be processed at any time, including immediately at the data collection site, or at any convenient time thereafter. Furthermore, because each frame to be processed is time stamped using a system wide standard, the various individual images, including those for the same or different cameras, can be easily correlated in near real time or at anytime without the timing errors found in the prior art systems. Because the frames are digitally time stamped, the various individual cameras are free to operate asynchronously in the analog domain.

Though the present invention applies equally to a wide range in the number of individual video cameras, in the preferred mode, eight camera stations are used. Each station has an analog video camera and a video digitizer or digital camera which converts the video camera analog output to a digital image. A computer in each station time stamps the initiation of the capture of each frame in relation to a system standard, compresses the digital data, and stores the data in local memory storage.

A master processor, which controls the entire system. has a hard drive for longer term digital image storage. The master processor and the eight stations are interconnected by a Dual FDDI Token Ring local area network (LAN) having a control ring for the two way transmission of timing and control signals and a data ring for the two way transmission of image data. Each station provides its station identification, the digitized video data and a delta time, described below, indicating the time delay from the system time token to the time at which the current video image scan began, over the data ring to the master processor which stores the data from all of the stations on the hard drive.

The master processor requests data for the current video frame from the stations by broadcasting a token over the control ring. This token is received by all stations. Each station has a local clock, periodically synchronized with the system time standard, which is used to determine the delta or offset time from beginning scan time of the current video frame until the time the token was received. Thus, the relative timing amongst all of the individual frames is known. This value can be calculated by a ranging process that measures the flight time of the time stamp through the networked stations.

In the preferred mode because the current video frame is the one requested, this results in the delta time for the camera in any station being no greater than one video frame time. Since the scan time for a video frame is approximately 1/30 of a second, the delta time is not greater than that amount. Thus, the delta or offset time is typically small, insuring a high degree of accuracy in correlating the frames from the various cameras, not withstanding a separate and asynchronous clock within each of the eight stations.

Unlike the prior art systems which rely upon synchronizing the video cameras, in accordance with the present invention, each camera may have a separate synch generator and therefore the delta time may be different for each camera. In essence, the transmission time of the token itself provides the timing reference for the cameras by means of the delta offset time. While there is also an inherent time delay for the transmission of the token from the master processor to each station, the time delay for each station is fixed and can be measured. A predetermined fixed transmission time for each station is simply added to the delta time for each station in later position calculations to more accurately determine the exact scan time initiation for the video frame.

Each station continues processing its current video image after receipt of the broadcast token. The first station to complete processing the entire current video image transmits a token over the control ring. Relative time correlation amongst the video frames from different cameras is reestablished because each contains a time stamp.

The station then transmits the compressed digital image data, the delta time and its station identifier to the master processor over the data ring. The master processor stores this data in its own memory storage. The next station to complete processing the current video image repeats the above procedure. This process continues until all eight of the stations have completed processing the entire current video image and provided the data to the master processor for storage. After all eight stations have responded, this completes the data transmission process for the master processor for a single master processor token transmission.

The essence of the present invention is that data provided is for the current images, and the beginning scan time for each current image can be determined accurately. This approach not only reduces the offset time between camera images, since the video scan time for one frame is relatively small, but also accurately determines the offset times between camera images. Further, since the time of transmission between the master processor and each station can be measured and included with the delta time computations, the actual acquisition time for the initiation of each video image can be determined with a high degree of accuracy. This results in position calculations based on this data being considerably more accurate than before.

In the preferred mode of the present invention, the vehicle has eight stations with each station having a single camera. The stations are arranged in pairs with the cameras in a pair both aimed in the same direction. While the camera pairs are both aimed in the same direction, each pair is aimed at right angles to all others, namely: forward, aft, perpendicular right and perpendicular left relative to the fore and aft line of the vehicle. One camera of each camera pair is focused for a zoomed-in close-up shot while the other camera is focused for a wide-angle shot. The zoomed camera shot provides greater detail but a smaller field of view than the wide angle shot. This may also be done with a single panoramic camera mounted at each station at 90% rotations to vertical and sampled more frequently.

In this arrangement each camera station responds to a request for data only upon completion of scanning the current image. This results in interleaving the data from the eight camera stations in a specific, preprogrammed order. However since the data from each station includes a station identifier, the images pertaining to each camera can be later identified by means of this station identification.

A global positioning system (GPS) mounted on the vehicle provides latitude, longitude and altitude, and their respective rates plus an accurate time signal. The position signals and their rates are received stored by the master processor along with all the digitized video data from each station. The time signal is also received, stored and correlated with data requests. In addition, the time signal is used to maintain the accuracy of a master processor time keeper and to periodically reset the time keeper in each station.

A fixed base GPS, located near the vehicle, is operated at the same time as the vehicle system, which includes the vehicle mounted GPS, to collect data which has the same intentional system errors introduced as does the vehicle mounted system. This permits correcting the intentional errors introduced into the GPS information by later differential processing of the fixed base GPS data versus data from the vehicle on-board GPS data.

The GPS system only updates the output data approximately three times per second, and occasionally there are no navigational satellites available to update the GPS data. An Inertial navigational System also mounted on the vehicle is provided to supplement the GPS data. The Inertial navigational system data is also received and stored by the master processor in its hard drive. Data from the Inertial navigational System includes not only position and altitude information and their rates, but also the yaw, pitch and roll information of the vehicle and their rates. All of this inertial data, updated approximately thirty times per second, is sent to the master processor where it is stored in memory along with a corresponding time signal.

The inertial information is used to supplement the GPS data for interpolation between data points and whenever navigation satellites are not available. In addition, the inertial yaw, pitch and roll information and their rates are used in later calculations to determine the actual direction of each camera's line of sight as a function of time to accurately determine the direction of objects in the cameras fields of view.

A second embodiment of this invention uses a single FDDI Token Ring LAN network to transmit both the control and data signals. This second embodiment sacrifices some transmission speed in exchange for a single ring network.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION

Figure 1:
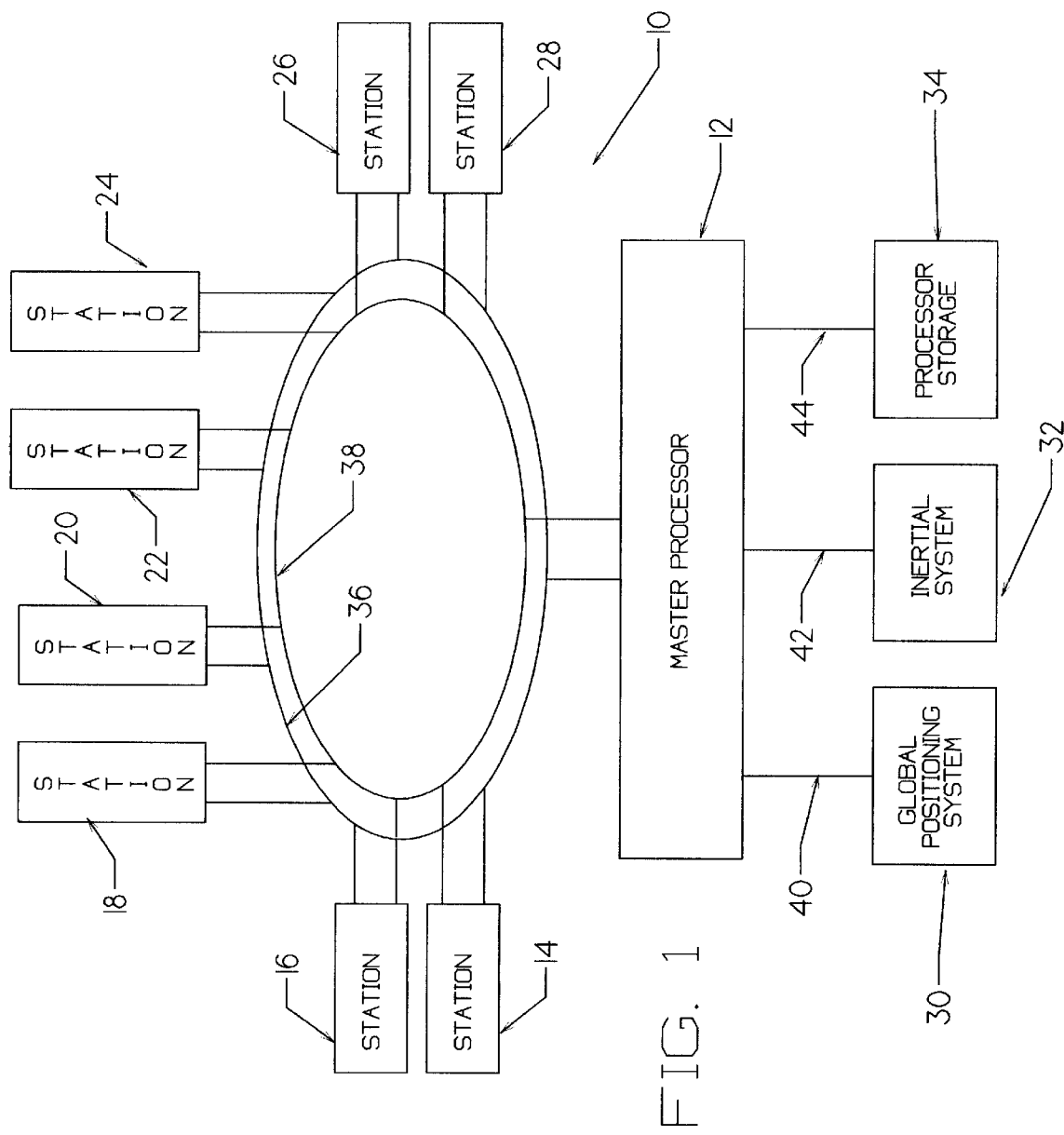
FIG. 1 is a block diagram of the overall system.
Figure 2:
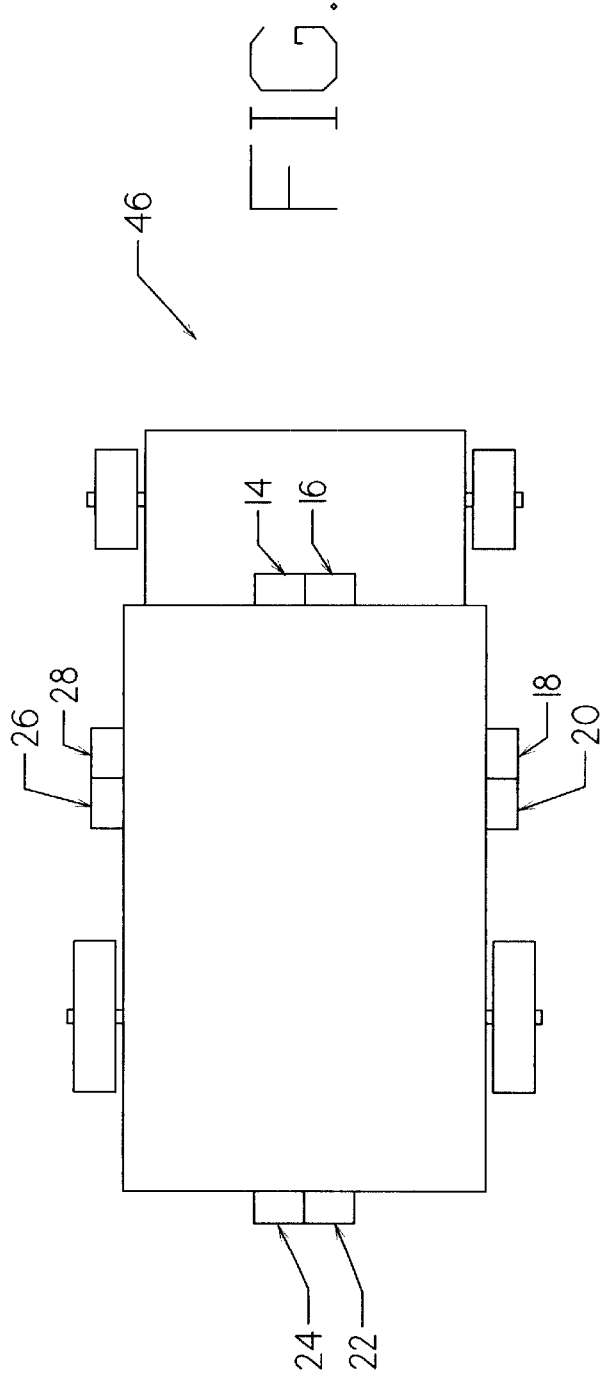
FIG. 2 is a top view of a vehicle showing camera locations.
Figure 2A:
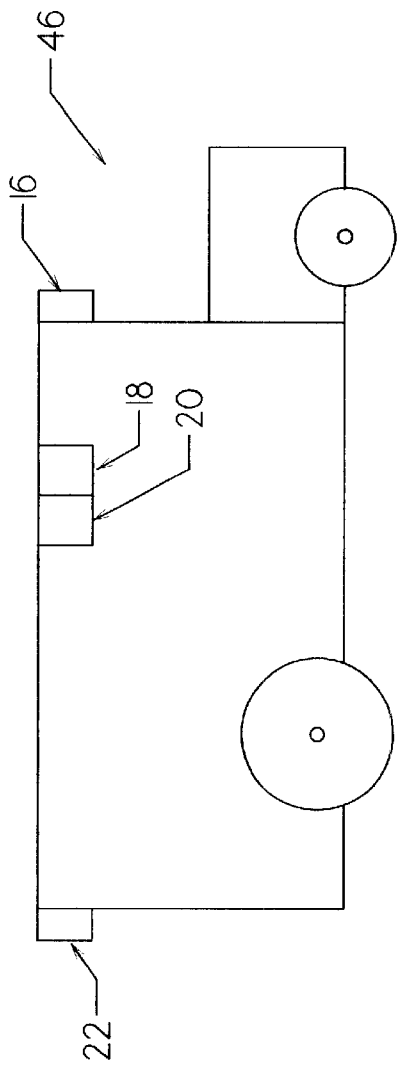
FIG. 2A is a side view of a vehicle showing camera locations.
Figure 3:
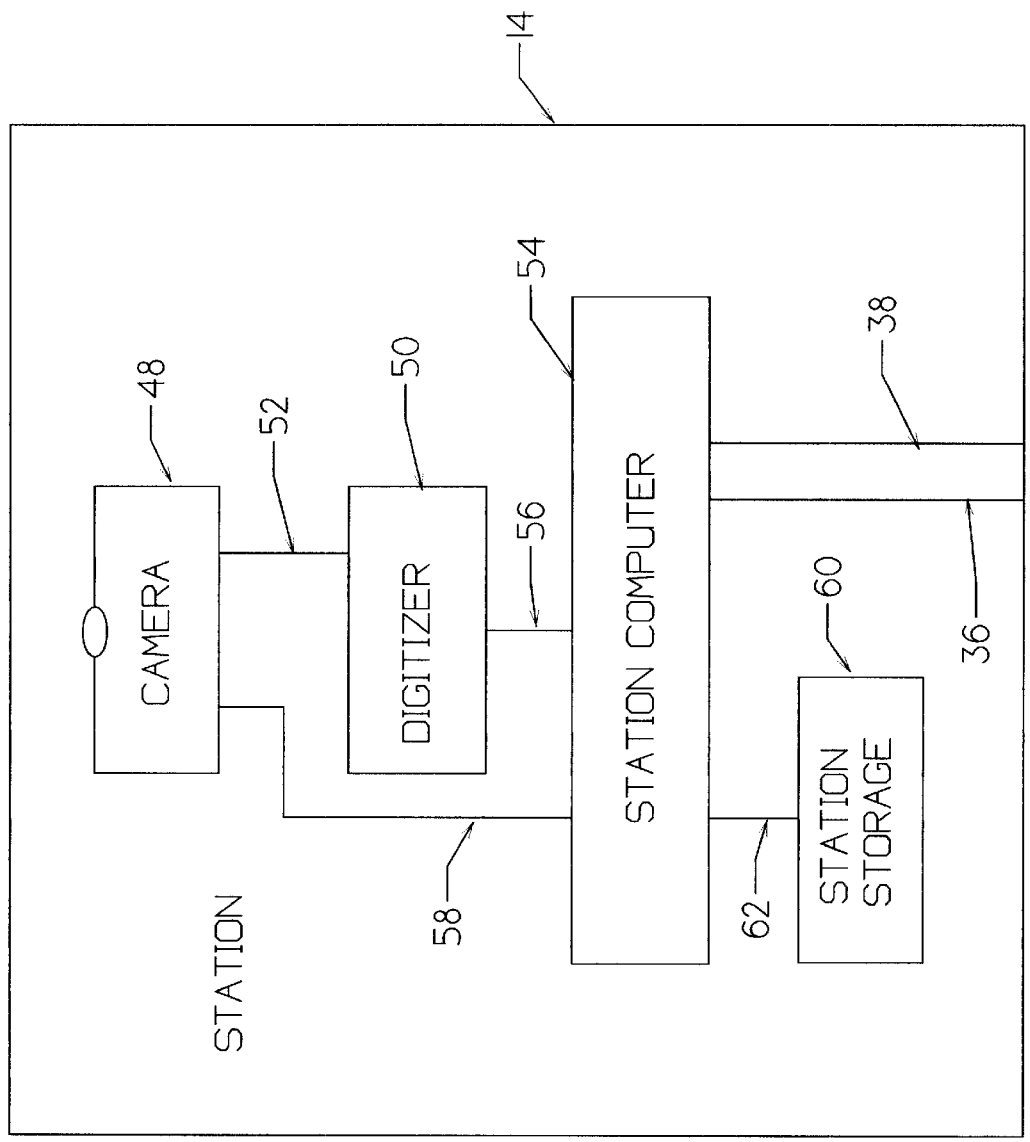
FIG. 3 is a block diagram of a camera station.

The apparatus used in this system is shown in FIGS. 1, 2 and 3. The overall system 10 includes a master processor 12, camera stations 14, 16, 18, 20, 22, 24, 26 and 28, global positioning system (GPS) 30, Inertial system 32, digital processor storage 34, dual FDDI control local area network (LAN) 36 and data LAN 38. These dual networks are fully described in the commonly available specifications. A second GPS, not shown, is operated in the vicinity of system 10 at the same time system 10 is being operated with the second GPS position and time being recorded separately for error correction during subsequent processing of the system data.

Stations 14, 16, 18, 20, 22, 24, 26 and 28 each have a camera and other identical apparatus which will be described later. Stations 14, 16, 18, 20, 22, 24, 26 and 28 communicate with master processor 12 through control LAN 36 and data LAN 38.

GPS 30 provides position, position rates, and time continuously to master processor 12 through lines 40. Inertial system 42 also provides position, position rates, attitude and attitude rates continuously to master processor 12 through lines 42. Master processor 12 communicates with processor storage 34 through lines 44 and stores all data upon receipt. In this apparatus master processor 12 is preferably a high speed high capacity microprocessor having a cache memory and related enhancements. Processor storage 34 is preferably a large capacity hard drive.

Station 14 is identical with all of the other stations 16, 18, 20, 22, 24, 26 and 28. Station 14 has an analog video camera 48 which communicates with a digitizer 50 through lines 52. Camera 48 is a typical analog video camera having a 30 times per second frame rate providing a complete video image, with a interleaved field scanned 60 times per second. Station 14 has a station computer 54, preferably a microprocessor. A digitizer 50 is arranged to digitize the analog data from camera 48 at a resolution and rate which will permit a later accurate representation of the analog data.

Station computer 54 communicates with digitizer 50 through lines 56 and with camera 48 through lines 58. Station storage 60 and station computer 54 communicate through lines 62. Station storage 60 is preferably a medium capacity hard drive. Station computer 54 of station 14 communicates with master computer 12 through control LAN 36 and data LAN 38 as do all the other stations 16, 18, 20, 22, 24, 26 and 28.

Vehicle 46 has an forward adjacent pair of stations 14 and 16 with each camera aimed directly forward, a right adjacent pair of stations 18 and 20 with each camera aimed right perpendicular to the vehicle centerline, an rear adjacent pair of stations 22 and 24 with each camera aimed directly rearward, and an left adjacent pair of stations 26 and 28 with each camera aimed left perpendicular to the vehicle centerline. One camera of each station pair 14, 16; 18, 20; 22, 24; and 26, 28 has a close-up focus and the other camera has a distant focus.

In operation, as vehicle 46 traverses a territory, each camera 48 continuously scans its video frame and sends the analog signal over lines 52 to digitizer 50 along with an indication of the beginning time of each frame scan. Station computer communicates with camera 48 over lines 58. Digitizer 50 continuously converts the analog data into the digital equivalent and sends the digital data to station computer 54 over lines 56. Station computer 54 compresses the digital data from digitizer 50 and determines the beginning scan time for the current video frame. Station computer 54 then stores the compressed data and the beginning scan time in station storage 60 over lines 62. Station storage 62 is preferably a high capacity hard disk.

Figure 4:
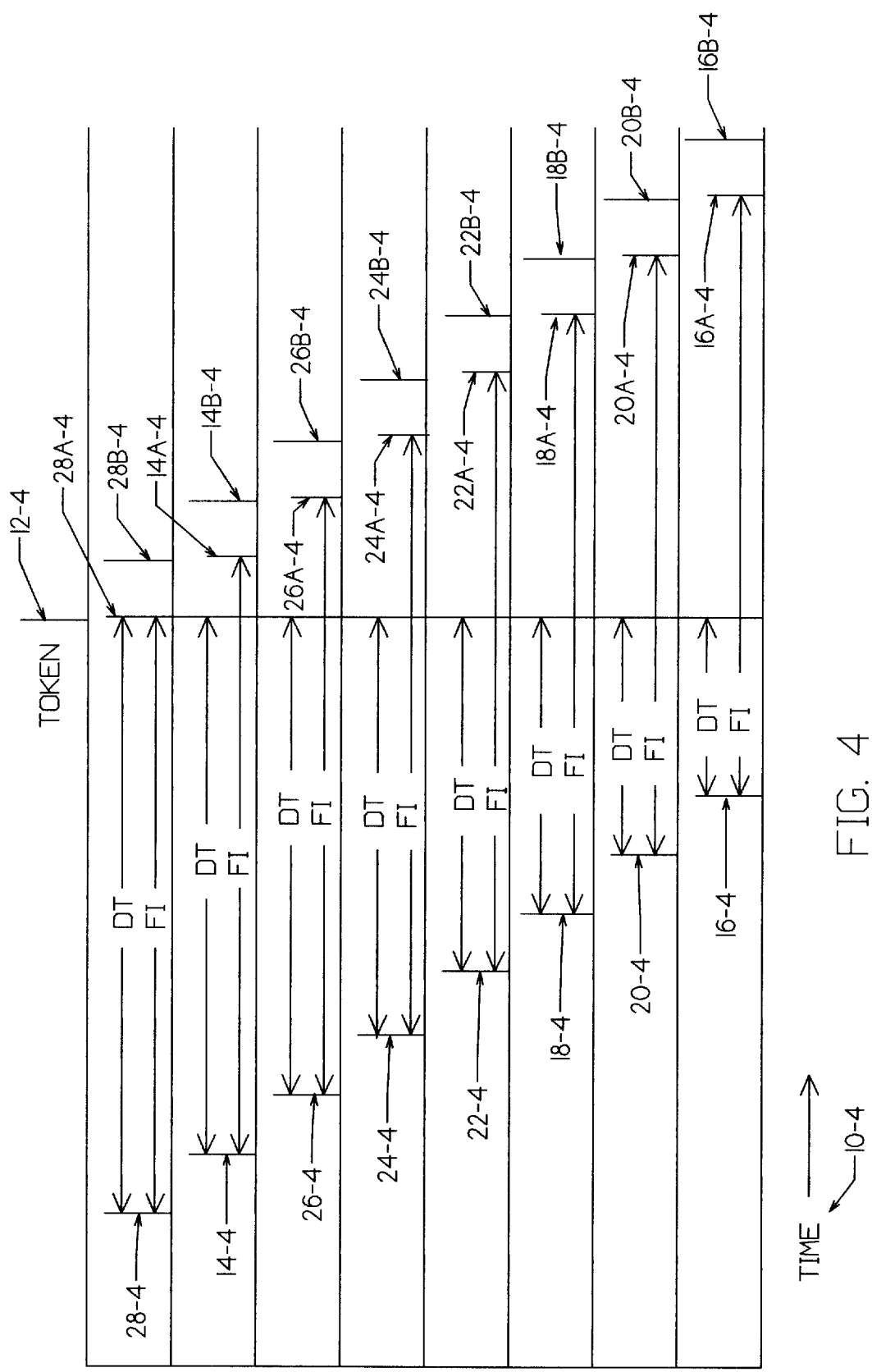
FIG. 4 is a timing diagram showing the stations token response.

FIG. 4 shows the timing for control and data transfer between stations 14, 16, 18, 20, 22, 24, 26 and 28 and master processor 12. Here time 10-4 runs from left to right. Periodically master processor 12 sends a token 12-4 over control LAN 36 to all stations 14, 16, 18, 20, 22, 24, 26 and 28 requesting current video data. Two time intervals are shown here, frame intervals (FI), which indicates the camera frame interval, and delta time (DT), which indicates the time from the beginning of the frame interval to the time token 10-4 was received by the station.

Here the first station to complete scanning the current frame is station 28. Station 28 has a DT beginning time 284. In this example, station 28 just completed scanning the current frame, indicated at 28A-4, when token 12-4 was received. This results in FI being identical with the DT interval. Station 28 will therefore respond immediately with a token 28A-4 which locks all other stations out of control LAN 36 and data LAN 38. Station 28 then determines the delta time by determining the difference between the beginning frame time and the token receipt time. Station 28 then transfers the delta time, along with the compressed and stored digitized data for the frame from storage 60, along with its station identifier to master processor 12 over data LAN 38. Master processor stores the data in storage 34 over lines 44 upon receipt.

Station 28 then sends its own token 28B-4 over control LAN 36 which frees the LANs for the other stations. The next station to complete scanning the current frame before the receipt of token 12-4 is station 14. This results in the DT for the interval between the DT beginning time 14-4 for station 14 and the receipt of token 12-4 being slightly less than the FI interval. Since the LAN has been freed by token 28B-4, station 14 can respond with token 14A-4 to again lock all other stations out of control LAN 36 and data LAN 38. Station 14 then transfers the same data as station 28 to master processor 12 over data LAN 38. Master processor again stores the data in its storage 34 over lines 44 upon receipt and station 14 sends a token 28B-4 over control LAN 36 to again free the LAN for other stations. This is repeated in the sequence that each respective frame scan is completed by each station, until all stations have transferred the above described information to mater processor 12.

The sequence of stations which complete scanning the current frame and the time order in this example are 28, 14, 26, 24, 22, 18, 20 and 16. The scan times for cameras 48 in each station are not synchronized with one another, therefore the sequence here is merely representative of an asynchronous situation in that the stations may report in any order and with any offset value up to one frame interval. As discussed earlier, the randomness of the station reporting sequence is not significant, since the data includes the station identifier, which permits a later determination of which data applied to which particular camera. The station identification also permits using the separate time delay in receiving token 12-4 in the various stations to further improve the determination of the actual offset times between cameras.

All the stations in turn issue a token to lock out the other stations from the LANs and after transferring their data issue a second token to free the LANs for a subsequent station to report until all eight stations have reported.

Each station continuously scans and stores digitized data in its own station storage 60, even while transferring data to master processor 12. Therefore after all eight stations have completed the data transfer for a token 12-4 from master processor 12, the stations can immediately respond to a subsequent token 12-4 from master processor with data from a subsequent frame.

Each master processor 12 token 12-4 results in storing eight video frames of view, station identifiers and time offsets. Since token 12-4 results in the current video frame data being transferred and since a video frame is scanned in $\frac{1}{30}$ of a second, all delta times will be $\frac{1}{30}$ of a second or less. These time offsets, along with the known transmission time from master processor 12 to each station, permit correlating the individual camera frames time of initiation with a great deal of accuracy. These accurate frame initiation times, which are much less than the time uncertainty for camera frames offsets in previous systems, where a subsequent frame is requested, permits determining a much more accurate location of objects in the video frames of view than previous systems.

Storing the above station data, the GPS 30, the inertial system 32 data and the second GPS data, permits a later determination of the geographic location of objects in the cameras field of view. In addition, as discussed earlier, the accurate time from GPS 30 is used to correct a time keeper, not shown, in master processor 12. This corrected master processor 12 time keeper is used to update time keepers, not shown, in each station to ensure that the delta time determined by each station is accurate.

The ability to identify objects in the camera fields of view is greatly enhanced with one camera of each station pair pointing in the same direction having a close-up focus and the other having a distant focus. This increases the chance of an object in the field of view being in focus and therefore easier to identify.

A second embodiment results from combining control LAN 36 and data LAN 38 into a single LAN. This network is fully described in the applicable network specifications. The operation of such a system using a single LAN is essentially the same as that described above, however here since the control and data signals both use the same lines, response times are potentially increased. Because the control and data signals must be interleaved, single LAN systems are more complex.

While this invention has been described with respect to specific embodiments, these descriptions are not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. An apparatus for collecting visual, spatial and attitude information relating to a moving vehicle comprising:
  a) a plurality of stations, each station having:
     i) at least one video camera having analog output data;
     ii) digitizer means for digitizing the camera analog output data to provide digitally captured images;
     iii) timing means for determining the time that scanning began for the current video frame;
     iv) digital storage means for storing said digitally captured images;
     v) a station computer having program means for compressing digital camera data from said digitizer, for storing said compressed data in said digital storage means, for determining the delta difference in time from the beginning of the current frame scan to a request signal, and for providing a station identifier;
  b) a master processor;
  c) digital storage means for storing digital data received by said master processor;
  d) dual token ring local area network means for interconnecting said master processor with all said stations for transmitting signals over a control ring and data over a data ring between said master processor and said stations; said control rings being arranged such that a message placed on the control ring by said master processor will request the current video frame data from all processors, and such that a message placed upon the control ring by a station will lock out all other stations until the same station releases said token and make the control ring available to the other stations;
  e) said station computer program means being further arranged such that, upon the receipt of a broadcast time signal issued by said master processor over said control ring, will determine the delta difference in time between the beginning scan time for the current video frame and the time of receipt of the token issued by the master processor, will complete processing and storing the current video frame in the station storage means, and when the control ring is available, will release the token to the control ring, and after it transmits the delta time, the station identifier, and the current stored frame data over the data ring to the master processor for storage.

2. An apparatus as in claim 1 further comprising:
  a) an inertial navigation system having digital data outputs of geographical position, altitude, attitude, and their rates, said data being provided to said master processor for storage; and
  b) a global positioning system having digital data outputs of time, geographical position and altitude, geographic position and altitude rates said data being provided to said master processor for storage.

3. An apparatus as in claim 1 having more than one stations arranged in adjacent pairs such that the single camera's fields of view of adjacent pairs may be aligned with one another, the cameras of a pair being focused at different distances, and the field of view for both cameras of an adjacent pair being perpendicular to the field of view for both cameras of all other adjacent pairs.

4. An apparatus as in claim 3 wherein, relative to said vehicle, one adjacent camera pair has a forward field of view, one adjacent camera pair has an aft field of view, one adjacent camera pair has a rightward field of view perpendicular to the vehicle fore and aft line, and one adjacent camera pair has a leftward field of view perpendicular to the vehicle fore and aft line.

* * * * *